(12) United States Patent
Liu

(10) Patent No.: US 12,155,756 B2
(45) Date of Patent: Nov. 26, 2024

(54) KEY GENERATION METHOD, TERMINAL DEVICE AND NETWORK DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventor: Fuwen Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 474 days.

(21) Appl. No.: 17/420,534

(22) PCT Filed: Jan. 2, 2020

(86) PCT No.: PCT/CN2020/070036
§ 371 (c)(1),
(2) Date: Jul. 2, 2021

(87) PCT Pub. No.: WO2020/140926
PCT Pub. Date: Jul. 9, 2020

(65) Prior Publication Data
US 2022/0085990 A1    Mar. 17, 2022

(30) Foreign Application Priority Data

Jan. 2, 2019 (CN) .......................... 201910000352.X

(51) Int. Cl.
*H04L 9/08* (2006.01)
*H04W 12/041* (2021.01)
(Continued)

(52) U.S. Cl.
CPC .......... *H04L 9/0861* (2013.01); *H04W 12/041* (2021.01); *H04L 63/0869* (2013.01); *H04W 12/06* (2013.01)

(58) Field of Classification Search
CPC ............... H04L 9/0861; H04L 63/0869; H04L 2209/805; H04L 9/14; H04W 12/041; H04W 12/06; H04W 4/70; H04W 12/04
See application file for complete search history.

(56) References Cited

U.S. PATENT DOCUMENTS 6,002,768 A * 12/1999 Albanese ........... H04N 21/2543
                                                    348/E7.071
7,894,605 B2    2/2011 Brown et al.
(Continued)

FOREIGN PATENT DOCUMENTS

CN    1532726 A    9/2004
CN    1759550 A    4/2006
(Continued)

OTHER PUBLICATIONS

International Search Report in the international application No. PCT/CN2020/070036, mailed on Apr. 1, 2020, 2 pgs.
(Continued)

*Primary Examiner* — John B King
(74) *Attorney, Agent, or Firm* — Cooper Legal Group, LLC

(57) ABSTRACT

The embodiment of the present application provides a key generation method, which relates to a terminal device, a network device and a computer-readable storage medium, wherein the method includes: determining a first key based on the long-term key; generating the session key based on the first key and at least one additional key, communicating with the network side based on the session key; wherein, the at least one additional key includes: an initial session key generated when the terminal device is connected to the
(Continued)

101

A first key is determined based on a long-term key

102

A current session key is generated based on the first key and at least one of additional keys, and communication with a network side is performed based on the current session key network for the first time, and/or a session key used in the last communication; the first key and the at least one additional key are both symmetric keys.

8 Claims, 2 Drawing Sheets

(51) Int. Cl.
*H04L 9/40* (2022.01)
*H04W 12/06* (2021.01)

(56) References Cited

U.S. PATENT DOCUMENTS

| | | | | |
|---|---|---|---|---|
| 8,107,397 B1* | 1/2012 | Bagchi | ............... | H04L 9/0833 380/278 |
| 2002/0191572 A1* | 12/2002 | Weinstein | ........... | H04L 63/0892 370/349 |
| 2005/0025091 A1* | 2/2005 | Patel | ............... | H04L 9/083 370/328 |
| 2005/0180315 A1* | 8/2005 | Chitrapu | ............... | H04L 1/0606 370/208 |
| 2007/0127719 A1* | 6/2007 | Selander | ............... | H04L 9/0891 380/277 |
| 2012/0011362 A1 | 1/2012 | Lambert | | |
| 2016/0056957 A1* | 2/2016 | Clarke | ............... | H04L 9/0825 380/285 |
| 2016/0119302 A1* | 4/2016 | Yi | ............... | H04L 9/0861 713/171 |
| 2016/0156462 A1* | 6/2016 | Winslow | ............... | H04L 9/0891 380/279 |
| 2016/0255070 A1* | 9/2016 | Näslund | ............... | H04L 9/0816 713/171 |
| 2016/0315937 A1* | 10/2016 | Al-Kadi | ............... | H04L 63/061 |
| 2017/0134943 A1* | 5/2017 | Min | ............... | H04W 12/04 |
| 2017/0250806 A1* | 8/2017 | Phillips | ............... | H04L 9/0861 |
| 2018/0331829 A1 | 11/2018 | Wang et al. | | |

FOREIGN PATENT DOCUMENTS

| | | | | |
|---|---|---|---|---|
| CN | 1941695 | A | | 4/2007 |
| CN | 103004243 | A | | 3/2013 |
| CN | 103457722 | A | | 12/2013 |
| CN | 102916957 | B | * | 3/2015 |
| CN | 104618380 | A | | 5/2015 |
| CN | 105530687 | A | | 4/2016 |
| CN | 106888092 | A | | 6/2017 |
| CN | 107409305 | A | | 11/2017 |
| CN | 107820239 | A | | 3/2018 |
| CN | 107920350 | A | | 4/2018 |
| CN | 108012267 | A | | 5/2018 |
| CN | 108141355 | A | | 6/2018 |
| CN | 108141754 | A | | 6/2018 |
| CN | 108347417 | A | | 7/2018 |
| CN | 108809903 | A | | 11/2018 |
| EP | 3350958 | A1 | | 7/2018 |
| JP | 2003037587 | A | | 2/2003 |
| JP | 2007110487 | A | | 4/2007 |
| JP | 2008547350 | A | | 12/2008 |
| WO | WO-0143335 | A2 | * | 6/2001 ....... H04L 12/40071 |
| WO | WO-2004084458 | A2 | * | 9/2004 ......... H04L 63/0428 |
| WO | WO-2015175185 | A1 | * | 11/2015 ............ G09G 5/006 |
| WO | 2018002856 | A1 | | 1/2018 |
| WO | 2018053271 | A1 | | 3/2018 |
| WO | 2018201946 | A1 | | 11/2018 |

OTHER PUBLICATIONS

English translation of the Written Opinion of the International Search Authority in the international application No. PCT/CN2020/ 070036, mailed on Apr. 1, 2020, 4 pgs.
"Resilience of Session Key Agreement", May 2016, 3GPP TSG SA WG3 (Security) Meeting #83, S3-160812, San Jose del Cabo (Mexico), Source:Vodafone, Huawei, Hisilicon, Nokia, Document for: Approval, Agenda Item: 8.9 Study on Architecture and Security for Next Generation System (FS_NSA), 5 pgs.
"pCR to Justify and Need to Extend the Usage Scope of PKI in 5G", Mar. 2017, 3GPP TSG SA WG3 (Security) Meeting #86bis, S3-170788, Busan, Korea, Source: China Mobile, Document for: Discussion/ approval, Agenda Item: 5.1.1, 11 pgs.
"pCR to 33.501—DH Procedure with SEAF for Protection Against Passive Eavesdropping", 2017, 3GPP TSG SA WG3 (Security) Meeting #89, S3-173263, Reno, USA, Source: Vodafone, Document for: Agreement, Agenda Item: 7.2.8., 6 pgs.
"Security Architecture and Procedures for 5G System", Jun. 2018, 3GPP TS 33.501, V15.1.0 3rd Generation Partnership Project; Technical Specification Group Services and System Aspects; (Release 15),146 pgs.
Study on the Security Aspects of the Next Generation System Aug. 2017, 3GPP TR 33.899 V1.3.0, 3rd Generation Partnership Project; Technical Specification Group Services and System Aspects; (Release 14),605 pgs.
"The Great SIM Heist—How Spies Stole the Keys to the Encryption Castle", Feb. 2015, Jeremy Scahill and Josh Begley, The Intercept, Reprinted from the Internet at: https://theintercept.com/2015/02/19/ great-sim-heist/., 24 pgs.
"Perfect-Forward Secrecy for the Extensible Authentication Protocol Method for Authentication and Key Agreement", Jul. 2018, J. Arkko, K. Norrman and V. Torvinen, Network Working Group, 22 pgs.
"Security Vulnerabilities in Handover Authentication Mechanism of 5G Network", 2018, Shubham Gupta, Balu L. Parne and Narendra S. Chaudhari, 2018 First International Conference on Secure Cyber Computing and Communication (ICSCCC), pp. 369-374.
"Security Architecture and Procedures for 5G System (Release 15)", Dec. 2018, 3GPP TS 33.501, V15.3.1, Technical Specification, 3rd Generation Partnership, Technical Specification Group Services and System Aspects, Mobile Competence Centre, France, 181 pgs.
"Study on Enhanced General Packet Radio Service(EGPRS) Access Security Enhancements with Relation to Cellular Internet of Things (IOT) (Release13)", Jun. 2016, 3GPP Standard; 3GPP TR 33.860, V13/1/0, Technical Report, 3rd Generation Partnership Project, Technical Specification Group Services and System Aspects, Mobile Competence Centre, France, 46 pgs.
Supplementary European Search Report in the European application No. 20735916.7, mailed on Jan. 4, 2022, 10 pgs.
Office Action of the Indian application No. 202117034006, issued on Mar. 9, 2022, 7 pgs.
"Security Architecture", Jul. 2020, 3GPP TS 33.102 V16.0.0, 3rd Generation Partnership Project; Technical Specification Group Services and System Aspects; 3G Security; (Release 16), 75 pgs.

* cited by examiner

KEY GENERATION METHOD, TERMINAL DEVICE AND NETWORK DEVICE

CROSS-REFERENCE TO RELATED APPLICATIONS

This is a national phase application of International Application No. PCT/CN2020/070036, filed on Jan. 2, 2020, which is based upon and claims priority to Chinese Patent Application No. 201910000352.X, filed on Jan. 2, 2019, the contents of which are hereby incorporated by reference in their entireties.

TECHNICAL FIELD

The present disclosure relates to the technical field of information processing, and more particular to a key generation method, a terminal device, a network device and a computer storage medium.

BACKGROUND

The 5th Generation Mobile Communication Technology (5G) will permeate every field of the future society and play a key role in building a user-centered all-around information ecosystem. Security architecture is the guarantee of the normal operation of the 5G network. An authentication protocol is the cornerstone of building 5G security architecture. A user equipment (UE) and the network generate parameters related to DH key exchange each time. Generation of these parameters requires use of asymmetric algorithms, which consumes a lot of computing resources, and is especially unacceptable for Internet of Things (IoT) terminals. Moreover, this processing can only protect against passive attacks (eavesdropping), not active attacks (man-in-the-middle attacks).

SUMMARY

To solve the technical problems, embodiments of the present disclosure provide a key generation method, a terminal device, a network device and a computer storage medium.

In the first aspect, a key generation method is provided, which is applied to a terminal device and may include the following operations.

A first key is determined based on a long-term key.

A current session key is generated based on the first key and at least one of additional keys, and communication with a network side is performed based on the current session key.

The additional keys include an initial session key generated when the terminal device is connected to a network for the first time, and/or a session key used in previous session. The first key and the additional keys are symmetric keys.

In the second aspect, a key generation method is provided, which is applied to a network device and may include the following operations.

A first key corresponding to a terminal device is determined based on a long-term key corresponding to the terminal device.

A current session key corresponding to the terminal device is generated based on the first key and at least one of additional keys, and communication with the terminal device is performed based on the current session key.

The additional keys include an initial session key generated when the terminal device is connected to the network for the first time, and/or a session key used in the previous session with the terminal device. The first key and the additional keys are symmetric keys.

In the third aspect, a terminal device is provided, which may include a first key generation unit and a first communication unit.

The first key generation unit is configured to determine a first key based on a long-term key, and generate a current session key based on the first key and at least one of additional keys.

The first communication unit is configured to communicate with the network side based on the current session key.

The additional keys include an initial session key generated when the terminal device is connected to the network for the first time, and/or a session key used in the previous session. The first key and the additional keys are symmetric keys.

In the fourth aspect, a terminal device is provided, which may include a first processor and a first communication interface.

The first processor is configured to determine a first key based on a long-term key, and generate a current session key based on the first key and at least one of additional keys.

The first communication interface is configured to communicate with the network side based on the current session key.

The additional keys include an initial session key generated when the terminal device is connected to the network for the first time, and/or a session key used in the previous session. The first key and the additional keys are symmetric keys.

In the fifth aspect, a network device is provided, which may include a second key generation unit and a second communication unit.

The second key generation unit is configured to determine a first key corresponding to a terminal device based on a long-term key corresponding to the terminal device, and generate a current session key corresponding to the terminal device based on the first key and at least one of additional keys.

The second communication unit is configured to communicate with the terminal device based on the current session key.

The additional keys include an initial session key generated when the terminal device is connected to the network for the first time, and/or a session key used in the previous session with the terminal device. The first key and the additional keys are symmetric keys.

In the sixth aspect, a network device is provided, which may include a second processor and a second communication interface.

The second processor is configured to determine a first key corresponding to a terminal device based on a long-term key corresponding to the terminal device, and generate a current session key corresponding to the terminal device based on the first key and at least one of additional keys.

The second communication interface is configured to communicate with the terminal device based on the current session key.

The additional keys include an initial session key generated when the terminal device is connected to the network for the first time, and/or a session key used in the previous session with the terminal device. The first key and the additional keys are symmetric keys.

In the seventh aspect, a computer storage medium is provided, which stores a computer program. The computer program, when executed by a processor, implements operations of the above method.

In the seventh aspect, a key generation system is provided, which may include at least one terminal device and an authentication server function (AUSF) entity.

The terminal device is configured to determine a first key based on a long-term key, generate a current session key based on the first key and at least one of additional keys, and communicate with the network side based on the current session key.

The AUSF entity is configured to determine the first key corresponding to the terminal device based on the long-term key corresponding to the terminal device, generate the current session key corresponding to the terminal device based on the first key and the at least one of the additional keys, and communicate with the terminal device based on the current session key. The additional keys include an initial session key generated when the terminal device is connected to the network for the first time, and/or a session key used in the previous session with the terminal device. The first key and the additional keys are symmetric keys.

With the technical solutions of the embodiments of the present disclosure, when a final session key is generated, in addition to the long-term key, the current session key may also be generated using the initial session key generated when the terminal device is connected to the network for the first time, and/or the session key used in the previous session. In this way, security enhancement of the session key can be realized without making a significant modification to the original authentication protocol. Further, the symmetric key algorithm has a low requirement on the operation of the device, and then the power consumption is also low. Therefore, it is more suitable for use in IoT scenarios.

DETAILED DESCRIPTION

The technical solutions in the embodiments of the present disclosure will be described below in combination with the drawings in the embodiments of the present disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Figure 1:
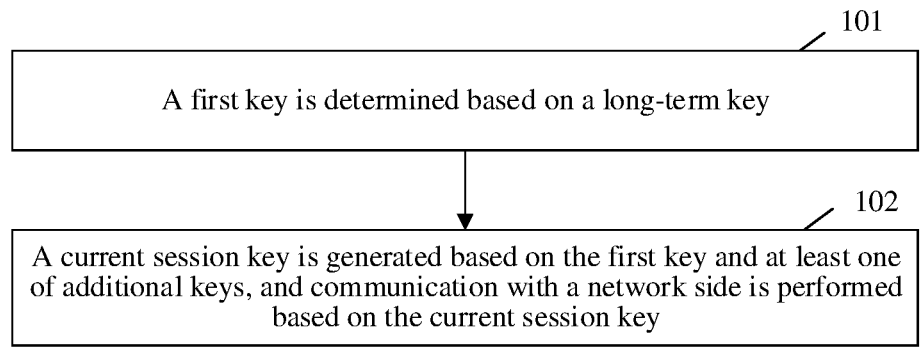
FIG. 1 is a first schematic flowchart of a key generation method provided by an embodiment of the present disclosure.

As illustrated in FIG. 1, the embodiment of the present disclosure provides a key generation method, which is applied to a terminal device and includes the following operations.

In 101, a first key is determined based on a long-term key.

In 102, a current session key is generated based on the first key and at least one of additional keys, and communication with a network side is performed based on the current session key.

The additional keys include an initial session key generated when the terminal device is connected to a network for the first time, and/or a session key used in the previous session. The first key and the additional keys are symmetric keys. The long-term key is also referred to as the root key or long-time key.

The present embodiment provides a plurality of specific processing scenarios, which are described below.

In the scenario 1, the current session key is generated using the initial session key and the first key, which is described as follows.

Before the first key is determined based on the long-term key, the method further includes the following operation. When the terminal device is connected to the network for the first time and has completed mutual authentication with an authentication server function (AUSF), the initial session key is generated.

That is, when the terminal device is connected to the network for the first time, the terminal device completes the mutual authentication with the AUSF, and generates the first key, which may be denoted as KSEAF_first.

The subsequent operation that the current session key is generated based on the first key and the at least one of the additional keys includes that: the current session key is generated based on the first key and the initial session key.

That is, after the mutual authentication between the terminal device and the AUSF is completed, a final session key KSEAF* is generated using the first initial session key KSEAF_first in addition to the first key KSEAF deduced from the long-term key K.

The terminal device is connected to the network for the first time, completes the mutual authentication with the AUSF, and generates the first key KSEAF_first. After the mutual authentication between the terminal device and the AUSF has been completed, the final session key is generated using the first key KSEAF_first in addition to the key KSEAF deduced from the long-term key K.

Figure 2:
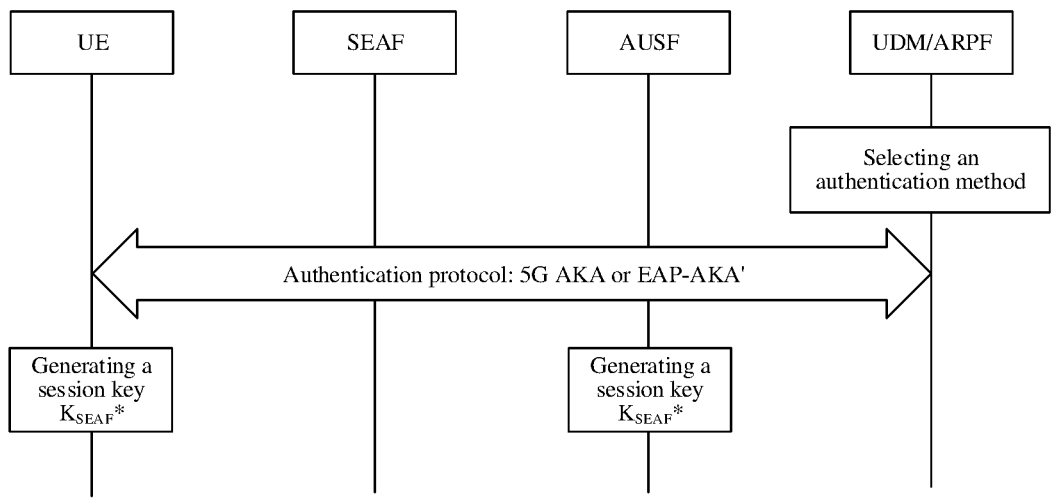
FIG. 2 is a second schematic flowchart of a key generation method provided by an embodiment of the present disclosure.

With reference to FIG. 2, this solution includes the following operations.

When authentication of a terminal device is to be performed by the network side, the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into a Unified Data Management (UDM) when the terminal device is subscribed with the network side. Then, when the terminal device needs to perform authentication, the UDM determines which authentication protocol is used by the terminal device for processing.

The terminal device and the network side perform mutual authentication using the selected authentication protocol. Specifically, the mutual authentication between the terminal device, for example, UE, and the UDM/ARPF is performed using the selected authentication protocol.

After the authentication, both the terminal device and the AUSF of the network side obtain the first key deduced based on the long-term key K, which may be represented as KSEAF.

Finally, the terminal device and the AUSF respectively use the first key KSEAF and the initial session key KSEAF_first stored in a secure area to generate the current session key KSEAF*. Calculation of the current session key KSEAF* may be expressed as follows:

$$KSEAF^* = KDF(KSEAF, KSEAF\_first, AP),$$

where KDF represents a key deduction function, for example, HMAC-SHA-256, and AP is an auxiliary parameter used for an auxiliary function, for example, preventing bidding down attacks. It is to be understood that the AP is an optional parameter, which may be used or not used, so the AP may not appear in the formula.

The initial session key may be stored separately in the terminal device and the AUSF of the network side. Specifically, at the terminal device side, the initial session key is stored in a Universal Subscriber Identity Module (USIM) or a storage area where the information cannot be tampered; at the AUSF, the initial session key is stored in a storage area where the information cannot be tampered.

It is to be noted that when the terminal device is connected to the network side for the first time and is authenticated for the first time, the initial session key may be set null, that is, when the user is authenticated for the first time, KSEAF_first=null. After the authentication between the network and the user is performed for the first time, the first key KSEAF* generated is set to the initial session key KSEAF_first and stored in the terminal device and the AUSF for a long time.

With regard to 5G AKA or EAP-AKA', the former is developed from the LTE-based authentication protocol EPS-AKA, while the latter is an authentication protocol defined by IETF, which is used for the UE in the 4G network to use Wireless Fidelity (WiFi) to access a operator network. In 5G, based on the EAP-AKA', the UE can not only access the operator network through WiFi, but also through a 5G wireless access network.

The authentication protocol AKA realizes the mutual authentication between the UE and the network by means of a root key K (i.e., long-term key K) stored in the USIM, and derives the session key. The assumption of security is that the root key K is unknown to anyone except a network operator, and thus an attacker cannot deduce the session key. However, the report [1] shows that this assumption is not always true, because the root key K may have been leaked at the production stage of the USIM card. So, a passive attacker may eavesdrop on communications using the session key derived from the root key K, and the exchange of messages between the UE and the network. An active attacker may use a large number of stolen root keys to forge a base station and launch a man-in-the-middle attack. The leakage of the long-term key has been regarded as a key problem in section 5.2.3.2 of TR33.899. Both the 5G-AKA and the EAP-AKA' are threatened by the leakage of the long-term key because they are developed based on the authentication protocol AKA.

In this way, the security of the final session key KSEAF* can be guaranteed, because except the key KSEAF generated based on the root key K, generation of the final session key also depends on the first key KSEAF_first. The attacker cannot obtain the final session key KSEAF*, unless the attacker can obtain the first key KSEAF_first, which is a relatively low probability.

In the scenario 2, the current session key is generated based on the session key of the previous session, which is described as follows.

The operation that the current session key is generated based on the first key and the at least one of the additional keys includes the following action.

The current session key is generated based on the first key and the session key used in the previous session.

That is, after the mutual authentication between the terminal device and the AUSF is completed, a final current session key KSEAF* is generated using the stored session key KSEAF_pre which is generated last time in addition to the key KSEAF deduced from the long-term key K.

That is, after the mutual authentication between the terminal device and the AUSF is completed, the final session key is generated using the stored session key KSEAF_pre which is generated last time in addition to the key KSEAF deduced from the long-term key K.

With reference to FIG. 2, the details are described as follows.

When authentication of a terminal device is to be performed by the network side, the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into a UDM when the terminal device is subscribed with the network side. Then, when the terminal device needs to perform authentication, the UDM determines which authentication protocol is used by the terminal device for processing.

The terminal device and the network side perform mutual authentication using the selected authentication protocol. Specifically, the mutual authentication between the terminal device, for example, UE, and the UDM/ARPF is performed using the selected authentication protocol.

After the authentication, both the terminal device and the AUSF obtain the session key KSEAF deduced based on the long-term key K.

The terminal device and the AUSF respectively use the KSEAF and the KSEAF_pre stored in the secure area to generate the final session key KSEAF*, which is calculated as follows:

$$KSEAF^* = KDF(KSEAF, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula.

It should be pointed out that when the network and the user authenticate each other for the first time, the session key used in the previous session may be set null, for example, KSEAF_pre=null. After the terminal device and the network generate the current session key KSEAF*, the current session key will replace the session key KSEAF_pre used in the previous session and stored in the terminal device and the network. That is, after the current session key is generated, the current session key may be stored in the terminal device and the network side respectively, and replace the session key used in the previous session for storage. Then, when the session key is generated again next time, the replaced session key used in the previous session is used for generating the next session key, which is processed in the same way as described above for this scenario, and will not be elaborated here.

In this way, the security of the final session key KSEAF* can be guaranteed, because except the key KSEAF generated based on the long-term key K, generation of the final session key also depends on the session key KSEAF_pre stored last time. The attacker cannot obtain the final session key KSEAF*, unless the attacker can obtain the session key KSEAF_pre stored last time. This requires the attacker to continuously obtain the session key KSEAF_pre stored last time to continuously obtain the final session key.

In the scenario 3, the current session key is generated based on the initial session key and the session key used in the previous session. The details are described as follows.

The operation that the current session key is generated based on the first key and the at least one of the additional keys includes the following action.

The current session key is generated based on the first key, the initial session key and the session key used in the previous session.

That is, the present scenario is based on the scenario 1 and the scenario 2, and the final session key KSEAF* is generated using the initial session key KSEAF_first and the session key KSEAF_pre generated last time in addition to the first key KSEAF deduced from the long-term key K.

The generation and storage of the initial session key and the session key used in the previous session are the same as that in the scenario 1 and the scenario 2, and will not be elaborated here.

The difference between the present scenario and the scenario 1 and the scenario 2 is that in the present scenario, the session key is generated using the initial session key KSEAF_first and the session key KSEAF_pre generated last time in addition to the first key KSEAF deduced from the long-term key K. The final session key KSEAF* is calculated as follows:

$$KSEAF^* = KDF(KSEAF, KSEAF\_first, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula. It should be pointed out that when the network and the user authenticate each other for the first time, KSEAF_pre=null, KSEAF_first=null.

The security of the scenario 3 is higher than that of the scenario 1 and the scenario 2, because in this scheme, to obtain the final session key, the attacker needs to obtain the first key and continuously obtain the session key KSEAF_pre stored last time.

Finally, it should be pointed out that all the scenarios provided in the present embodiment use only a symmetric key algorithm (key deduction algorithm).

With the above solution, when the final session key is generated, in addition to the long-term key, the current session key may also be generated using the initial session key generated when the terminal device is connected to the network for the first time, and/or the session key used in the previous session. In this way, security enhancement of the session key can be realized without making a significant modification to the original authentication protocol. Moreover, the symmetric key algorithm has a low requirement on the operation of the device, and then the power consumption is also low. Therefore, it is more suitable for use in the IoT scenarios.

Figure 3:
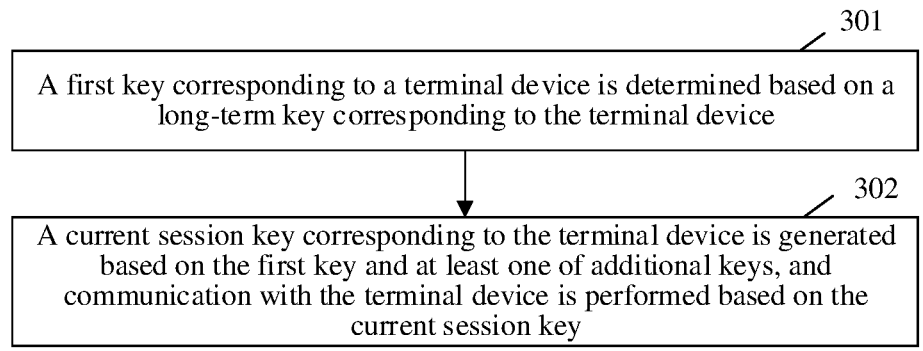
FIG. 3 is a third schematic flowchart of a key generation method provided by an embodiment of the present disclosure.

As illustrated in FIG. 3, the embodiment of the present disclosure provides a key generation method, which is applied to a network device and includes the following operations.

In 301, a first key corresponding to a terminal device is determined based on a long-term key corresponding to the terminal device.

In 302, a current session key corresponding to the terminal device is generated based on the first key and at least one of additional keys, and communication with the terminal device is performed based on the current session key.

The at least one of the additional keys includes an initial session key generated when the terminal device is connected to the network for the first time, and/or a session key used in the previous session with the terminal device. The first key and the at least one of the additional keys are symmetric keys.

The network device in the present embodiment may be considered as a device with the AUSF function at the network side.

The present embodiment provides a plurality of specific processing scenarios, which are described below.

In the scenario 1, the current session key is generated using the initial session key and the first key, which is described as follows.

Before the first key corresponding to the terminal device is determined based on the long-term key corresponding to the terminal device, the method further includes the following operation.

When the terminal device is connected to the network for the first time and has completed the mutual authentication with the AUSF, the initial session key used by the network side to communicate with the terminal device is generated.

That is, when the terminal device is connected to the network for the first time and has completed the mutual authentication with the AUSF, the first key is generated, which may be denoted as KSEAF_first.

The operation that the current session key corresponding to the terminal device is generated based on the first key and the at least one of the additional keys includes the following action.

The current session key of the terminal device is generated based on the first key corresponding to the terminal device and the initial session key generated when the terminal device is connected to the network for the first time.

That is, after the mutual authentication between the terminal device and the AUSF is completed, the final session key KSEAF* is generated using the first initial session key KSEAF_first in addition to the first key KSEAF deduced from the long-term key K.

The terminal device is connected to the network for the first time, completes the mutual authentication with the AUSF, and generates the first key KSEAF_first. After the mutual authentication between the terminal device and the AUSF is completed later, the final session key is generated using the first key KSEAF_first in addition to the key KSEAF deduced from the long-term key K.

With reference to FIG. 2, this solution includes the following operations.

When authentication of a terminal device is to be performed by the UDM of the network side, the UDM of the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into the UDM when the terminal device is subscribed with the network side. Then, when the terminal device needs to perform authentication, the UDM determines which authentication protocol is used by the terminal device for processing.

The terminal device and the network side perform mutual authentication using the selected authentication protocol. Specifically, the mutual authentication between the terminal device, for example, UE, and the UDM/ARPF is performed using the selected authentication protocol.

After the authentication, both the terminal device and the network device, for example, the AUSF, of the network side obtain the first key deduced based on the long-term key K, which may be represented as KSEAF.

Finally, the terminal device and the AUSF respectively use the first key KSEAF and the initial session key KSEAF_first stored in the secure area to generate the current session key KSEAF*. The current session key KSEAF* may be calculated as follows:

$$KSEAF^* = KDF(KSEAF, KSEAF\_first, AP),$$

where KDF represents a key deduction function, for example, HMAC-SHA-256, and AP is an auxiliary parameter used for an auxiliary function, for example, preventing bidding down attacks. It is to be understood that the AP is an optional parameter, which may be used or not used, so the AP may not appear in the formula.

The initial session key may be stored separately in the terminal device and the AUSF of the network side. Specifically, at the terminal device side, the initial session key is stored in the USIM or the storage area where the information cannot be tampered; at the AUSF, the initial session key is stored in the storage area where the information cannot be tampered.

It is to be noted that when the terminal device is connected to the network side for the first time and is authenticated for the first time, the initial session key may be set null, that is, when the user is authenticated for the first time, KSEAF_first=null. After the authentication between the network and the user is performed for the first time, the first key KSEAF* generated is set to the initial session key KSEAF_first and stored in the terminal device and the AUSF for a long time.

In this way, the security of the final session key KSEAF* can be guaranteed, because except the key KSEAF generated based on the root key K, generation of the final session key also depends on the first key KSEAF_first. The attacker cannot obtain the final session key KSEAF*, unless the attacker can obtain the first key KSEAF_first, which is a relatively low probability.

In the scenario 2, the current session key is generated based on the session key of the previous session, which is described as follows.

The operation that the current session key corresponding to the terminal device is generated based on the first key and the at least one of the additional keys includes the following action.

The current session key used by the network side to communicate with the terminal device is generated based on the first key and the session key used in the previous session with the terminal device.

That is, after the mutual authentication between the terminal device and the AUSF is completed, the final current session key KSEAF* is generated using the session key KSEAF_pre generated in the previous session with the terminal device and stored by both the terminal device and the network device, in addition to the key KSEAF deduced from the long-term key K.

That is, after the mutual authentication between the terminal device and the AUSF is completed, the final session key is generated using the stored session key KSEAF_pre which is generated last time in addition to the key KSEAF deduced from the long-term key K.

With reference to FIG. 2, the details are as follows.

When authentication of a terminal device is to be performed by the network side, the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into a UDM when the terminal device is subscribed with the network side. Then, when the terminal device needs to perform authentication, the UDM determines which authentication protocol is used by the terminal device for processing.

The terminal device and the network side perform mutual authentication using the selected authentication protocol. Specifically, the mutual authentication between the terminal device, for example, UE, and the UDM/ARPF is performed using the selected authentication protocol.

After the authentication, both the terminal device and the AUSF obtain the session key KSEAF deduced based on the long-term key K.

The terminal device and the AUSF respectively use the KSEAF and the KSEAF_pre stored in the secure area to generate the final session key KSEAF*, which is calculated as follows:

$$KSEAF^* = KDF(KSEAF, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula.

It should be pointed out that when the network and the user authenticate each other for the first time, the session key used in the previous session may be set null, for example, KSEAF_pre=null. After the terminal device and the network generate the current session key KSEAF*, the current session key will replace the session key KSEAF_pre used in the previous session and stored in the terminal device and the network. That is, after the current session key is generated, the current session key may be stored in the terminal device and the network side respectively, and replace the session key used in the previous session for storage. Then, when the session key is generated again next time, the replaced session key used in the previous session is used for generating the next session key, which is processed in the same way as described above for this scenario, and will not be elaborated here.

In this way, the security of the final session key KSEAF* can be guaranteed, because except the key KSEAF generated based on the long-term key K, generation of the final session key also depends on the session key KSEAF_pre stored last time. The attacker cannot obtain the final session key KSEAF*, unless the attacker can obtain the session key KSEAF_pre stored last time. This requires the attacker to continuously obtain the session key KSEAF_pre stored last time to continuously obtain the final session key.

In the scenario 3, the current session key is generated based on the initial session key and the session key used in the previous session. The details are described as follows.

The current session key used by the network side to communicate with the terminal device is generated based on the first key, the initial session key generated when the terminal device is connected to the network for the first time, and the session key used in the previous session with the terminal device.

That is, the present scenario is based on the scenario 1 and the scenario 2, and the final session key KSEAF* is generated using the initial session key KSEAF_first and the session key KSEAF_pre generated last time in addition to the first key KSEAF deduced from the long-term key K.

The generation and storage of the initial session key and the session key used in the previous session are the same as that in the scenario 1 and the scenario 2, and will not be elaborated here.

The difference between the present scenario and the scenario 1 and the scenario 2 is that in the present scenario, the session key is generated using the initial session key KSEAF_first and the session key KSEAF_pre generated last time in addition to the first key KSEAF deduced from the long-term key K. The final session key KSEAF* is calculated as follows:

$$KSEAF^* = KDF(KSEAF, KSEAF\_first, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula. It should be pointed out that when the network and the user authenticate each other for the first time, KSEAF_pre=null, KSEAF_first=null.

The security of the scenario 3 is higher than that of the scenario 1 and the scenario 2, because in this scheme, to obtain the final session key, the attacker needs to obtain the first key and continuously obtain the session key KSEAF_pre stored last time.

Finally, it should be pointed out that all the scenarios provided in the present embodiment use only the symmetric key algorithm (key deduction algorithm). The symmetric key algorithm has a low requirement on the operation of the device, and then the power consumption is also low. Therefore, it is more suitable for use in the IoT scenarios.

With the above solution, when the final session key is generated, in addition to the long-term key, the current session key may be generated using the initial session key generated when the terminal device is connected to the network for the first time, and/or the session key used in the previous session. In this way, security enhancement of the session key can be realized without making a significant modification to the original authentication protocol.

Figure 4:
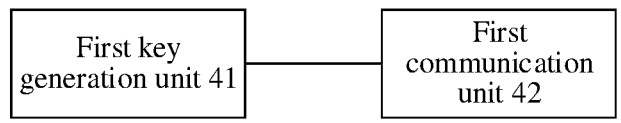
FIG. 4 is a first composition structure diagram of a terminal device provided by an embodiment of the present disclosure.

As illustrated in FIG. 4, the embodiment of the present disclosure provides a terminal device, which includes a first key generation unit 41 and a first communication unit 42.

The first key generation unit 41 is configured to determine a first key based on a long-term key, and generate a current session key based on the first key and at least one of additional keys.

The first communication unit 42 is configured to communicate with the network side based on the current session key.

The additional keys include an initial session key generated when the terminal device is connected to the network for the first time, and/or the session key used in the previous session. The first key and the additional keys are symmetric keys.

Figure 5:
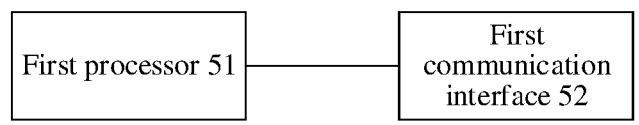
FIG. 5 is a second composition structure diagram of a terminal device provided by an embodiment of the present disclosure.

As illustrated in FIG. 5, the embodiment of the present disclosure provides a terminal device, which includes a first processor 51 and a first communication interface 52.

The first processor 51 is configured to determine a first key based on a long-term key, and generate a current session key based on the first key and at least one of additional keys.

The first communication interface 52 is configured to communicate with the network side based on the current session key.

The additional keys include an initial session key generated when the terminal device is connected to the network for the first time, and/or the session key used in the previous session. The first key and the additional keys are symmetric keys.

The present embodiment provides a plurality of specific processing scenarios, which are described below.

In the scenario 1, the current session key is generated using the initial session key and the first key, which is described as follows.

The first processor 51 is configured to generate the initial session key when the terminal device is connected to the network for the first time and has completed the mutual authentication with the AUSF.

That is, when the terminal device is connected to the network for the first time, the terminal device completes the mutual authentication with the AUSF, and generates the first key, which may be denoted as KSEAF_first.

The first processor 51 is configured to generate the current session key based on the first key and the initial session key.

That is, after the mutual authentication between the terminal device and the AUSF is completed, the final session key KSEAF* is generated using the first initial session key KSEAF_first in addition to the first key KSEAF deduced from the long-term key K.

The terminal device is connected to the network for the first time, completes the mutual authentication with the AUSF, and generates the first key KSEAF_first. After the mutual authentication between the terminal device and the AUSF has been completed, the final session key is generated using the first key KSEAF_first in addition to the key KSEAF deduced from the long-term key K.

With reference to FIG. 2, this solution includes the following operation.

When authentication of a terminal device is to be performed by the network side, the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into a UDM when the terminal device is subscribed with the network side. Then, when the terminal device needs to perform authentication, the UDM determines which authentication protocol is used by the terminal device for processing.

The terminal device and the network side perform mutual authentication using the selected authentication protocol. Specifically, the mutual authentication between the terminal device, for example, UE, and the UDM/ARPF is performed using the selected authentication protocol.

After the authentication, both the terminal device and the AUSF of the network side obtain the first key deduced based on the long-term key K, which may be represented as KSEAF.

Finally, the terminal device and the AUSF respectively use the first key KSEAF and the initial session key KSEAF_first stored in the secure area to generate the current session key KSEAF*. Calculation of the current session key KSEAF* may be expressed as follows:

$$KSEAF^* = KDF(KSEAF, KSEAF\_first, AP),$$

where KDF represents a key deduction function, for example, HMAC-SHA-256, and AP is an auxiliary parameter used for an auxiliary function, for example, preventing the bidding down attacks. It is to be understood that the AP is an optional parameter, which may be used or not used, so the AP may not appear in the formula.

The initial session key may be stored separately in the terminal device and the AUSF of the network side. Specifically, at the terminal device side, the initial session key is stored in a USIM or a storage area where the information cannot be tampered; at the AUSF, the initial session key is stored in a storage area where the information cannot be tampered.

It is to be noted that when the terminal device is connected to the network side for the first time and is authenticated for the first time, the initial session key may be set null, that is, when the user is authenticated for the first time, KSEAF_first=null. After the authentication between the network and the user is performed for the first time, the first key KSEAF* generated is set to the initial session key KSEAF_first and stored in the terminal device and the AUSF for a long time.

In this way, the security of the final session key KSEAF* can be guaranteed, because except the key KSEAF generated based on the root key K, generation of the final session key also depends on the first key KSEAF_first. The attacker cannot obtain the final session key KSEAF*, unless the attacker can obtain the first key KSEAF_first, which is a relatively low probability.

In the scenario 2, the current session key is generated based on the session key of the previous session, which is described as follows.

The first processor 51 is configured to generate the current session key based on the first key and the session key used in the previous session.

That is, after the mutual authentication between the terminal device and the AUSF is completed, the final current session key KSEAF* is generated using the stored session key KSEAF_pre which is generated last time in addition to the key KSEAF deduced from the long-term key K.

After the mutual authentication between the terminal device and the AUSF is completed, the final session key is generated using the stored session key KSEAF_pre which is generated last time in addition to the key KSEAF deduced from the long-term key K.

With reference to FIG. 2, the details are described as follows.

When authentication of a terminal device is to be performed by the network side, the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into a UDM when the terminal device is subscribed with the network side. Then, when the terminal device needs to perform authentication, the UDM determines which authentication protocol is used by the terminal device for processing.

The terminal device and the network side authenticate each other using the selected authentication protocol. Specifically, the terminal device, for example, the UE, and the UDM/ARPF authenticate each other using the selected authentication protocol.

After the authentication, both the terminal device and the AUSF obtain the session key KSEAF deduced based on the long-term key K.

The terminal device and the AUSF respectively use the KSEAF and the KSEAF_pre stored in the secure area to generate the final session key KSEAF*, which is calculated as follows:

$$KSEAF^* = KDF(KSEAF, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula.

It should be pointed out that when the network and the user authenticate each other for the first time, the session key used in the previous session may be set null, for example, KSEAF_pre=null. After the terminal device and the network generate the current session key KSEAF*, the current session key will replace the session key KSEAF_pre used in the previous session and stored in the terminal device and the network. That is, after the current session key is generated, the current session key may be stored in the terminal device and the network side respectively, and replace the session key used in the previous session for storage. Then, when the session key is generated again next time, the replaced session key used in the previous session is used for generating the next session key, which is processed in the same way as described above for this scenario, and will not be elaborated here.

In this way, the security of the final session key KSEAF* can be guaranteed, because except the key KSEAF generated based on the long-term key K, generation of the final session key also depends on the session key KSEAF_pre stored last time. The attacker cannot obtain the final session key KSEAF*, unless the attacker can obtain the session key KSEAF_pre stored last time. This requires the attacker to continuously obtain the session key KSEAF_pre stored last time to continuously obtain the final session key.

In the scenario 3, the current session key is generated based on the initial session key and the session key used in the previous session. The details are described as follows.

The first processor 51 is configured to generate the current session key based on the first key, the initial session key, and the session key used in the previous session.

That is, the present scenario is based on the scenario 1 and the scenario 2, and the final session key KSEAF* is generated using the initial session key KSEAF_first and the session key KSEAF_pre generated last time in addition to the first key KSEAF deduced from the long-term key K.

The generation and storage of the initial session key and the session key used in the previous session are the same as that in the scenario 1 and the scenario 2, and will not be elaborated here.

The difference between the present scenario and the scenario 1 and the scenario 2 is that in the present scenario, the session key is generated using the initial session key KSEAF_first and the session key KSEAF_pre generated last time in addition to the first key KSEAF deduced from the long-term key K. The final session key KSEAF* is calculated as follows:

$$KSEAF^* = KDF(KSEAF, KSEAF\_first, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula. It should be pointed out that when the network and the user authenticate each other for the first time, KSEAF_pre=null, KSEAF_first=null.

The security of the scenario 3 is higher than that of the scenario 1 and the scenario 2, because in this scheme, to obtain the final session key, the attacker needs to obtain the first key and continuously obtain the session key KSEAF_pre stored last time.

Finally, it should be pointed out that all the scenarios provided in the present embodiment use only the symmetric key algorithm (key deduction algorithm). The symmetric key algorithm has a very low requirement on the operation of the device, and then the power consumption is also very low. Therefore, it is more suitable for use in the IoT scenarios.

With the above solution, when the final session key is generated, in addition to the long-term key, the current session key may also be generated using the initial session key generated when the terminal device is connected to the network for the first time, and/or the session key used in the previous session. In this way, security enhancement of the session key can be realized without making a significant modification to the original authentication protocol.

Figure 6:
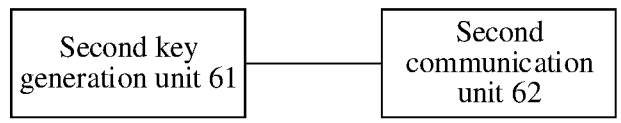
FIG. 6 is a first composition structure diagram of a network device provided by an embodiment of the present disclosure.

As illustrated in FIG. 6, the embodiment of the present disclosure provides a network device, which includes a second key generation unit 61 and a second communication unit 62.

The second key generation unit 61 is configured to determine a first key corresponding to a terminal device based on a long-term key corresponding to the terminal device, and generate a current session key corresponding to the terminal device based on the first key and at least one of additional keys.

The second communication unit 62 is configured to communicate with the terminal device based on the current session key.

The additional keys include an initial session key generated when the terminal device is connected to the network for the first time, and/or a session key used in the previous session with the terminal device. The first key and the additional keys are symmetric keys.

Figure 7:
FIG. 7 is a second composition structure diagram of a network device provided by an embodiment of the present disclosure.

As illustrated in FIG. 7, the embodiment of the present disclosure provides a network device, which includes a second processor 71 and a second communication interface 72.

The second processor 71 is configured to determine a first key corresponding to a terminal device based on a long-term key corresponding to the terminal device, and generate a current session key corresponding to the terminal device based on the first key and at least one of additional keys.

The second communication interface 72 is configured to communicate with the terminal device based on the current session key.

The additional keys include an initial session key generated when the terminal device is connected to the network for the first time, and/or a session key used in the previous session with the terminal device. The first key and the additional keys are symmetric keys.

The network device in the present embodiment may be considered as a device with the AUSF function at the network side.

The present embodiment provides a plurality of specific processing scenarios, which are described below.

In the scenario 1, the current session key is generated using the initial session key and the first key, which is described as follows.

The second processor 71 is configured to generate the initial session key used by the network side to communicate with the terminal device when the terminal device is connected to the network for the first time and has completed the mutual authentication with the AUSF.

That is, when the terminal device is connected to the network for the first time and has completed the mutual authentication with the AUSF, the first key is generated, which may be denoted as KSEAF_first.

The second processor 71 is configured to generate the current session key of the terminal device based on the first key corresponding to the terminal device and the initial session key generated when the terminal device is connected to the network for the first time.

That is, after the mutual authentication between the terminal device and the AUSF is completed, the final session key KSEAF* is generated using the first initial session key KSEAF_first in addition to the first key KSEAF deduced from the long-term key K.

The terminal device is connected to the network for the first time, completes the mutual authentication with the AUSF, and generates the first key KSEAF_first. After the mutual authentication between the terminal device and the AUSF is completed later, the final session key is generated using the first key KSEAF_first in addition to the key KSEAF deduced from the long-term key K.

With reference to FIG. 2, this solution includes the following operations.

When authentication of a terminal device is to be performed by the UDM of the network side, the UDM of the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into the UDM when the terminal device is subscribed with the network side. Then, when the terminal device needs to perform authentication, the UDM determines which authentication protocol is used by the terminal device for processing.

The terminal device and the network side perform mutual authentication using the selected authentication protocol. Specifically, the mutual authentication between the terminal device, for example, UE, and the UDM/ARPF is performed using the selected authentication protocol.

After the authentication, both the terminal device and the network device at the network side, for example, the AUSF, obtain the first key deduced based on the long-term key K, which may be represented as KSEAF.

Finally, the terminal device and the AUSF respectively use the first key KSEAF and the initial session key KSEAF_first stored in the secure area to generate the current session key KSEAF*. The current session key KSEAF* may be calculated as follows:

$$KSEAF^* = KDF(KSEAF, KSEAF\_first, AP),$$

where KDF represents the key deduction function, for example, HMAC-SHA-256, and AP is the auxiliary parameter used for the auxiliary function, for example, preventing the bidding down attacks. It is to be understood that the AP is an optional parameter, which may be used or not used, so the AP may not appear in the formula.

The initial session key may be stored separately in the terminal device and the AUSF of the network side. Specifically, at the terminal device side, the initial session key is stored in the USIM or the storage area where the information cannot be tampered; at the AUSF, the initial session key is stored in the storage area where the information cannot be tampered with.

It is to be noted that when the terminal device is connected to the network side for the first time and is authenticated for the first time, the initial session key may be set null, that is, when the user is authenticated for the first time, KSEAF_first=null. After the authentication between the network and the user is performed for the first time, the first key KSEAF* generated is set to the initial session key KSEAF_first and stored in the terminal device and the AUSF for a long time.

In this way, the security of the final session key KSEAF* can be guaranteed, because except the key KSEAF generated based on the root key K, generation of the final session key also depends on the first key KSEAF_first. The attacker cannot obtain the final session key KSEAF*, unless the attacker can obtain the first key KSEAF_first, which is a relatively low probability.

In the scenario 2, the current session key is generated based on the session key of the previous session, which is described as follows.

The second processor 71 is configured to generate the current session key used by the network side to communicate with the terminal device based on the first key and the session key used in the previous session with the terminal device.

That is, after the mutual authentication between the terminal device and the AUSF is completed, the final current session key KSEAF* is generated using the session key KSEAF_pre generated in the previous session with the terminal device and stored by both the terminal device and the network device in addition to the key KSEAF deduced from the long-term key K.

After the mutual authentication between the terminal device and the AUSF is completed, the final session key is generated using the stored session key KSEAF_pre which is generated last time in addition to the key KSEAF deduced from the long-term key K.

With reference to FIG. 2, the details are as follows.

When authentication of a terminal device is to be performed by the network side, the network side determines, according to a profile of the terminal device, a specific authentication protocol through which the terminal device is authenticated. The authentication protocol may be 5G AKA or EAP-AKA', of course, there may be other authentication protocols, which are not exhaustive in the present embodiment. In addition, the relevant information profile of the user's terminal device may be written into a UDM when the terminal device is subscribed with the network side. Then, when the terminal device needs to perform authentication, the UDM determines which authentication protocol is used by the terminal device for processing.

The terminal device and the network side authenticate each other using the selected authentication protocol. Specifically, the terminal device, for example, the UE, and the UDM/ARPF authenticate each other using the selected authentication protocol.

After the authentication, both the terminal device and the AUSF obtain the session key KSEAF deduced based on the long-term key K.

The terminal device and the AUSF respectively use the KSEAF and the KSEAF_pre stored in the secure area to generate the final session key KSEAF*, which is calculated as follows:

$$KSEAF^* = KDF(KSEAF, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula.

It should be pointed out that when the network and the user authenticate each other for the first time, the session key used in the previous session may be set null, for example, KSEAF_pre=null. After the terminal device and the network generate the current session key KSEAF*, the current session key will replace the session key KSEAF_pre used in the previous session and stored in the terminal device and the network. That is, after the current session key is generated, the current session key may be stored in the terminal device and the network side respectively, and replace the session key used in the previous session for storage. Then, when the session key is generated again next time, the replaced session key used in the previous session is used for generating the next session key, which is processed in the same way as described above for this scenario, and will not be elaborated here.

In this way, the security of the final session key KSEAF* can be guaranteed, because except the key KSEAF generated based on the long-term key K, generation of the final session key also depends on the session key KSEAF_pre stored last time. The attacker cannot obtain the final session key KSEAF*, unless the attacker can obtain the session key KSEAF_pre stored last time. This requires the attacker to continuously obtain the session key KSEAF_pre stored last time to continuously obtain the final session key.

In the scenario 3, the current session key is generated based on the initial session key and the session key used in the previous session. The details are described as follows.

The second processor 71 is configured to generate the current session key used by the network side to communicate with the terminal device based on the first key, the initial session key generated when the terminal device is connected to the network for the first time, and the session key used in the previous session with the terminal device.

That is, the present scenario is based on the scenario 1 and the scenario 2, and the final session key KSEAF* is generated using the initial session key KSEAF_first and the session key KSEAF_pre generated last time in addition to the first key KSEAF deduced from the long-term key K.

The generation and storage of the initial session key and the session key used in the previous session are the same as that in the scenario 1 and the scenario 2, and will not be elaborated here.

The difference between the present scenario and the scenario 1 and the scenario 2 is that in the present scenario, the session key is generated using the initial session key KSEAF_first and the session key KSEAF_pre generated last time in addition to the first key KSEAF deduced from the long-term key K. The final session key KSEAF* is calculated as follows:

$$KSEAF^* = KDF(KSEAF, KSEAF\_first, KSEAF\_pre, AP),$$

where KDF is the key deduction function, for example, HMAC-SHA-256, and AP is the auxiliary parameter used for the auxiliary function, for example, preventing the bidding down attacks. AP is an optional parameter and may not appear in the formula. It should be pointed out that when the network and the user authenticate each other for the first time, KSEAF_pre=null, KSEAF_first=null.

The security of the scenario 3 is higher than that of the scenario 1 and the scenario 2, because in this scheme, to obtain the final session key, the attacker needs to obtain the first key and continuously obtain the session key KSEAF_pre stored last time.

Finally, it should be pointed out that all the scenarios provided in the present embodiment use only the symmetric key algorithm (key deduction algorithm). The symmetric key algorithm has a low requirement on the operation of the device, and then the power consumption is also low. Therefore, it is more suitable for use in the IoT scenarios.

With the above solution, when the final session key is generated, in addition to the long-term key, the current session key may be generated using the initial session key generated when the terminal device is connected to the network for the first time, and/or the session key used in the previous session. In this way, security enhancement of the session key can be realized without making a significant modification to the original authentication protocol.

The embodiments of the disclosure also provide a computer-readable storage medium, which is configured to store a computer program.

Optionally, the computer-readable storage medium may be applied to any network device in the embodiments of the disclosure, and the computer program enables a computer to execute corresponding flows implemented by the network device in each method of the embodiments of the disclosure, which are not elaborated herein for simplicity.

Figure 8:
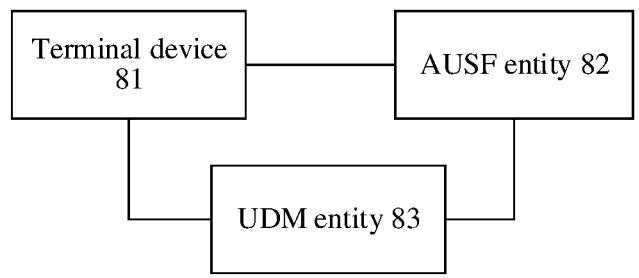
FIG. 8 is a composition structure diagram of a system provided by an embodiment of the present disclosure.

The embodiment of the present disclosure also provides a key generation system. As illustrated in FIG. 8, the system includes at least one terminal device 81 and an AUSF entity 82.

The terminal device 81 is configured to determine a first key based on a long-term key, generate a current session key based on the first key and at least one of additional keys, and communicate with the network side based on the current session key.

The AUSF entity 82 is configured to determine the first key corresponding to the terminal device based on the long-term key corresponding to the terminal device, generate the current session key corresponding to the terminal device based on the first key and the at least one of the additional keys, and communicate with the terminal device based on the current session key. The additional keys include an initial session key generated when the terminal device is connected to the network for the first time and/or a session key used in the previous session with the terminal device. The first key and the additional keys are symmetric keys.

The system further includes a UDM entity 83, configured to complete authentication with the terminal device when the terminal device is connected to the network for the first time.

The terminal device is configured to complete, when being connected to the network for the first time, authentication with the UDM entity, generate and save the initial session key.

The terminal device is configured to generate the current session key based on the first key and the initial session key.

The AUSF entity is configured to generate the current session key used by the network side to communicate with the terminal device based on the first key corresponding to the terminal device and the initial session key generated when the terminal device is connected to the network for the first time.

The terminal device is configured to generate the current session key based on the first key and the session key used in the previous session.

The AUSF entity is configured to generate the current session key used by the network side to communicate with the terminal device based on the first key and the session key used in the previous session with the terminal device.

The terminal device is configured to generate the current session key based on the first key, the initial session key, and the session key used in the previous session.

The AUSF entity is configured to generate the current session key used by the network side to communicate with the terminal device based on the first key, the initial session key generated when the terminal device is connected to the network for the first time, and the session key used in the previous session with the terminal device.

In addition, the functions of each device in the system are the same as those of the above method or device embodiments, which will not be elaborated.

Those of ordinary skill in the art may realize that the units and algorithm operations of each example described in combination with the embodiments disclosed in the disclosure may be implemented by electronic hardware or a combination of computer software and electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the disclosure. The abovementioned storage medium includes various media capable of storing program codes such as a U disk, a mobile hard disk, a Read-Only Memory (ROM), a Read Access Memory (RAM), a magnetic disk or an optical disk.

The above is only the specific implementations of the present disclosure and not intended to limit the scope of protection of the present disclosure. Any variation or replacement apparent to those skilled in the art within the technical scope disclosed by the present disclosure shall fall within the scope of protection of the present disclosure. Therefore, the scope of protection of the disclosure shall be subject to the scope of protection of the claims.

The invention claimed is:

1. A key generation method, applied to a terminal device, comprising:
   determining a first key based on a long-term key; and
   generating a current session key based on the first key and additional keys, and communicating with a network side based on the current session key;
   wherein the additional keys comprise an initial session key generated when the terminal device is connected to a network for a first time and a session key used in a previous session with the terminal device, the previous session is a session immediately prior to a current session, and the first key and the additional keys are symmetric keys.

2. The method of claim 1, wherein before determining the first key based on the long-term key, the method further comprises:
   when the terminal device is connected to the network for the first time, completing mutual authentication with the network side and generating the initial session key.

3. A key generation method, applied to a network device, comprising:
   determining a first key corresponding to a terminal device based on a long-term key corresponding to the terminal device; and
   generating a current session key corresponding to the terminal device based on the first key and additional keys, and communicating with the terminal device based on the current session key;
   wherein the additional keys comprise an initial session key generated when the terminal device is connected to a network for a first time and a session key used in a previous session with the terminal device, the previous session is a session immediately prior to a current session, and the first key and the additional keys are symmetric keys.

4. The method of claim 3, wherein before determining the first key corresponding to the terminal device based on the long-term key corresponding to the terminal device, the method further comprises:
   after the terminal device is connected to the network for the first time and has completed mutual authentication with the network, generating the initial session key corresponding to the terminal device.

5. A terminal device, comprising:
   a first memory for storing a computer program;
   a first processor, configured to execute the computer program to: determine a first key based on a long-term key, and generate a current session key based on the first key and additional keys; and
   a first communication interface, configured to communicate with a network side based on the current session key;
   wherein the additional keys comprise an initial session key generated when the terminal device is connected to a network for a first time and a session key used in a previous session with the terminal device, the previous session is a session immediately prior to a current session, and the first key and the additional keys are symmetric keys.

6. The terminal device of claim 5, wherein the first processor is configured to execute the computer program to: complete, when connecting to the network for the first time, mutual authentication with the network, and generate the initial session key.

7. A network device, comprising:
   a second memory for storing a computer program;
   a second processor, configured to execute the computer program to determine a first key corresponding to a terminal device based on a long-term key corresponding to the terminal device, and generate a current session key corresponding to the terminal device based on the first key and additional keys; and
   a second communication interface, configured to communicate with the terminal device based on the current session key;
   wherein the additional keys comprise an initial session key generated when the terminal device is connected to a network for a first time and a session key used in a previous session with the terminal device, the previous session is a session immediately prior to a current session, and the first key and the additional keys are symmetric keys.

8. The network device of claim 7, wherein the second processor is configured to execute the computer program to: generate the initial session key corresponding to the terminal device after the terminal device is connected to the network for the first time and has completed mutual authentication with the network.

* * * * *